(12) United States Patent  (10) Patent No.: US 6,499,638 B2
Campbell  (45) Date of Patent: Dec. 31, 2002

(54) MOTORCYCLE LUGGAGE

(76) Inventor: Gregory L. Campbell, W7043 School Rd., Greenville, WI (US) 54942

( * ) Notice: Subject to any disclaimer, the term of this patent is extended or adjusted under 35 U.S.C. 154(b) by 0 days.

(21) Appl. No.: 09/906,469

(22) Filed: Jul. 17, 2001

(65) Prior Publication Data

US 2002/0005421 A1 Jan. 17, 2002

Related U.S. Application Data

(60) Provisional application No. 60/218,545, filed on Jul. 17, 2000.

(51) Int. Cl.<sup>7</sup> ................................................. B62J 9/00
(52) U.S. Cl. ...................... 224/430; 190/18 A; 248/95
(58) Field of Search ............................... 224/430, 431, 224/417; 248/95; 190/18 A

(56) References Cited

U.S. PATENT DOCUMENTS

| | | | |
|---|---|---|---|
| 2,423,003 A | | 6/1947 | Buegeleisen ................. 224/32 |
| 2,553,739 A | * | 5/1951 | Ashdowne .................. 224/413 |
| 3,693,484 A | | 9/1972 | Sanderson, Jr. ................ 81/90 |
| 4,081,117 A | * | 3/1978 | Crane ......................... 224/413 |
| 4,262,780 A | * | 4/1981 | Samuelian ..................... 16/29 |
| 4,328,915 A | * | 5/1982 | Melton, III .................. 224/430 |
| 4,387,835 A | | 6/1983 | Golzer .......................... 224/32 |
| 4,402,439 A | * | 9/1983 | Brown ........................ 224/417 |
| 4,580,706 A | * | 4/1986 | Jackson et al. ............. 224/417 |
| 4,629,040 A | * | 12/1986 | Jones .......................... 190/102 |
| 5,240,106 A | | 8/1993 | Plath ....................... 206/316.2 |
| 5,353,900 A | * | 10/1994 | Stilley ........................ 190/115 |
| 5,628,436 A | * | 5/1997 | Jones et al. ............... 224/148.3 |
| 5,810,230 A | * | 9/1998 | Nutto .......................... 224/417 |
| 6,053,384 A | * | 4/2000 | Bachman ..................... 224/413 |
| 6,223,960 B1 | * | 5/2001 | Powell et al. ................ 190/125 |
| 6,293,450 B1 | * | 9/2001 | Aron ........................... 224/413 |

* cited by examiner

Primary Examiner—Stephen P. Garbe
(74) Attorney, Agent, or Firm—Russell L. Johnson Patent Agent

(57) ABSTRACT

A readily detachable and attachable saddle bag for motorcycles and other vehicles. The saddle bag is securable to a plane defining mounting plate that matches indices on a saddle bag and quick release couplings so that the the saddle bag can be quickly attached to and detached from the mounting plate. The mounting plate is low cost and is provided with means for securing the plate to a flat surface or for attaching transition links to the mounting plate for securing the mounting plate to the irregular structures such as the frame of a motorcycle or the like. The bag is provided with detachable wheels and pulling or carrying straps and an attachment for joining two similar saddle bags together.

10 Claims, 4 Drawing Sheets

MOTORCYCLE LUGGAGE

RELATED APPLICATIONS

This patent application claims the benefits of a related Provisional Patent Application, No. 60/218,545, filed Jul. 17, 2000.

BACKGROUND

Like their predecessor in the days of horse transportation, saddle bags for motorcycles are all weather carrying containers.

Unlike their predecessors, saddle bags for motorcycles need to remain secured in place on the motorcycle at high speeds and take some rough jars and jolts without being dislodged from their mountings.

Motorcycle saddle bags are made of quality materials to be stiff and durable. They are, when compared to conventional luggage, odd shaped, heavy and somewhat awkward to carry.

OBJECTS

It is an object of this invention to provide an all-weather carrying bag that serves as saddle bags when mounted to a motorcycle and as luggage when dismounted from the motorcycle.

It is further an object of this invention to provide a means for readily attaching the bag to a motorcycle and for detaching the bag from the motorcycle.

It is further an object of this invention to provide a mounting means which may be secured to a structure and the mounting means is configured so as to cooperate with the attaching and detaching means of the bag so that the bag may be quickly attached to or detached from the mounting means.

It is further an object of this invention to provide the saddle bags and mounting means described above wherein the saddle bags and the mounting means are configured so as to permit them to serve many roles and provide many auxiliary functions.

Other objects will be made apparent by the following specifications and claims.

BRIEF DESCRIPTION OF THE INVENTION

The invention is for a saddle bag and mounting plate and for a coupling means for mounting the saddle bag to and detaching the saddle bag from the mounting plate.

The saddle bag has a substantially planer back panel and a continuous gusset which forms the sides and the bottom of the bag and the gusset is joined to the back panel by means of an outward projecting seam and the back panel is provided with at least one female member of a quick release coupling secured to the back panel of the bag near the top of the back panel inside the saddle bag.

The mounting plate has a substantial planer surface having a J-shaped lip formed at the bottom of the plate for receiving and retaining a portion of the outward directed seam at the bottom of the bag, a means for securing the plate to a structure, and at plate and alignable with the female member of the quick release coupling secured to the back panel of the bag when the outward projecting seam of the bag resides in the J-shaped lip.

The bag when out of engagement with the mounting plate can serve as luggage and is provided with D-rings for attaching a carrying and/or pulling strap, wheel receivers for receiving detachable wheels, a piggy back external pouch securable to the gusset for carrying accessories such as straps and wheels and locks and the like.

The mounting plate is provided with means for securing the plate directly to a flat surface, and the plate is provided with means for securing transitional links to enable the securing of the mounting plate to a variety of different style motorcycles and other vehicles by using different transitional links for different styles of vehicles.

DESCRIPTION OF THE RELATED ART

The prior art is replete with saddle bags for motorcycles and the means for mounting them to motorcycles. U.S. Pat. 2,423,003 to Buegeleisen, is representative of motorcycle saddle bags and mounts wherein the saddlebag is configured to receive and engage with a mounting plate wherein the means of securing the saddle baa is in the interior of the bag.

The art provides numerous examples of saddle bag-like luggage that is attachable to and detachable from two wheeled vehicles such as bicycles and motorcycles. U.S. Pat. 4,387,835 to Golzer is representative of luggage that is secured to vehicles as saddle bags and serves as luggage or utility baggage when detached from a vehicle.

It is well known in the hose coupling art to provide a coupling wherein a male member in the shape of a circular rod is provided with a circumferential groove and a female member is provided with a spring loaded sliding sleeve and a ring of spherical detent elements that are free to separate and permit the male rod to enter the ring of detents so that the detents can reside in the circumferential groove when the sleeve is retracted and are maintained in interlocking engagement therein when the sleeve is resiliently returned to its operating position. U.S. Pat. No. 3,693,484 to Sanderson Jr. is an example of such a coupling employed as a means for coupling two elements of a working combination.

The art abounds in baggage and luggage that is provided with pouches, compartments, wheels, carrying and towing straps and handles and attachments for the same, along with the structures to support them. U.S. Pat. 5,240,106 to Plath is representative of such luggage or baggage.

This invention has aspects in common with the above cited references, and performs many of the functions performed by the devices of the cited prior art, however, the combinations of this invention are not found in the prior art and the mode of operation of the elements of this invention is different from that taught by the prior art as will be made clear by the following disclosures.

DETAILED DESCRIPTION OF THE INVENTION

Figure 1:
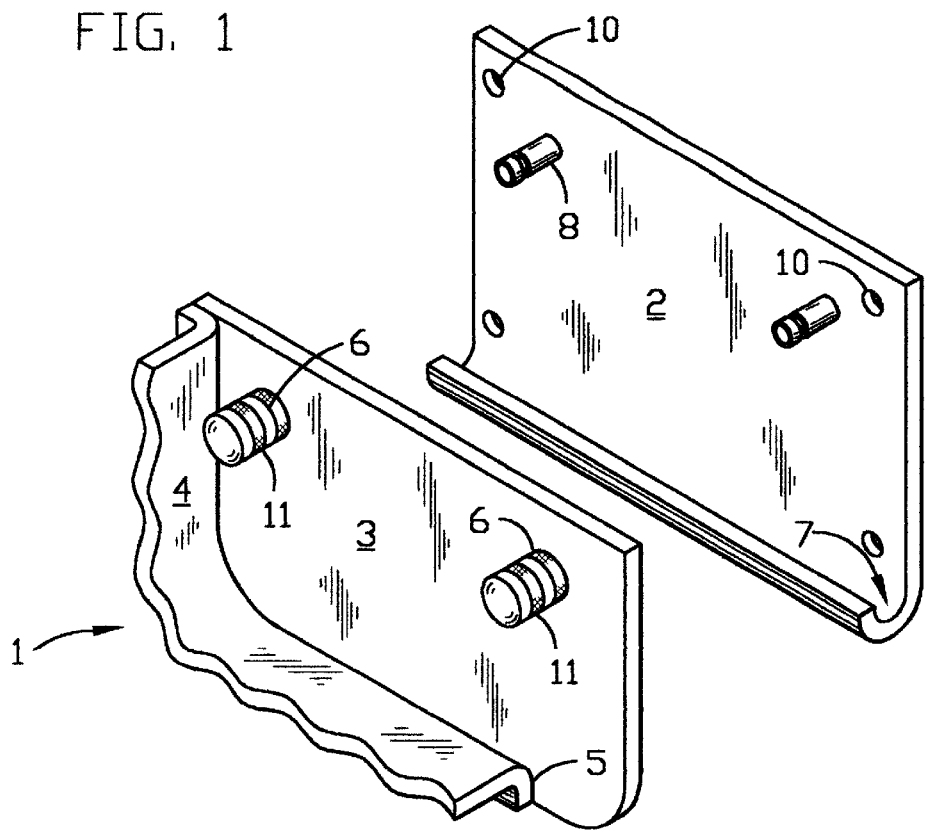
FIG. 1 is a fragmentary perspective view of a portion of the saddle bag and mounting plate of this invention.

In the drawings like numbers refer to like objects and the proportions of some components have been modified to facilitate illustration.

The invention is hereinafter disclosed as a motorcycle saddlebag. It should be understood that one important aspect of the instant invention is to provide a saddlebag-like structure and mounting means that will serve to mount the bag to many different vehicles and serve many utilities not ordinarily associated with motorcycle saddlebags.

The term "plane defining" as used herein shall be read to mean "having indices that define a plane". For example: three points not on a straight line, a line and a point, etc.

Figure 2:
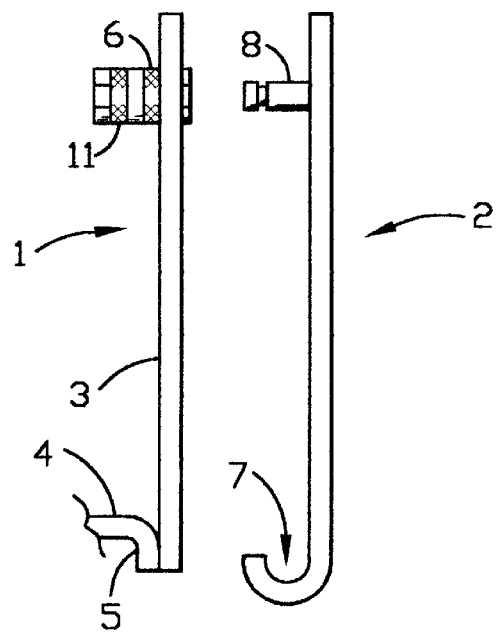
FIG. 2 is a sectioned elevational view of the bag and plate of FIG. 1 in position for joining.
Figure 3:
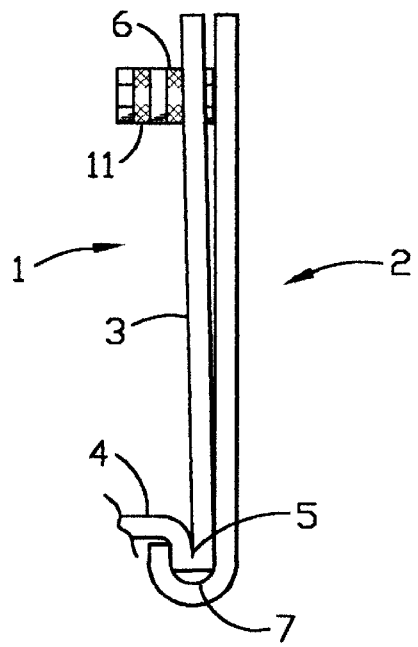
FIG. 3 is a sectioned elevational view of the bag and plate of FIG. 1 joined together.

Referring now to FIGS. 1–3 wherein the meals of attaching bag 1 to, and detaching bag 1 from mounting plate 2 is illustrated. Bag 1 has a substantially planar back panel 3 and continuous gusset 4 forms two sides and the bottom of bag 1 and gusset 4 is joined with panel 3 by means of outward projecting seam 5. Female coupling members 6 is attached to the inside of panel 3 near the top of panel 3. Plate 2 is a plane defining plate and has formed at its bottom edge a J-shaped lip 7 for receiving outward projecting seam 5 of bag 1 and has secured near its top edge male coupling members 8. Mounting plate 2 is provided with mounting holes 10 by means of which plate 2 may be secured to a structure. Bag 1 is joined to plate 2 by inserting seam 5 of bag 1 into the J-shaped lip 7 of plate 2 and then inserting male coupling member 8 into female coupling member 6 which achieves a locking joinder. Bag 1 is detached from plate 2 by sliding locking collar 11 of female coupling member 6 away from panel 3 to release male coupling member 8 and thereby permitting the separation of the coupling and thereafter, the lifting of seam 5 from J-shaped lip 7 to complete the detaching of bag 1 from plate 3.

In the embodiment of FIGS. 1 through 3, the novel underlying concept of the invention is illustrated. The quick release coupling formed by members 6 and 8 have not heretofore been employed for attaching a bag or luggage to a mounting plate. Baggage or luggage having a substantially planer surface can be rendered readily attachable to a plane defining mounting plate such as mounting plate 2 by providing the bag with a matching set of plane defining elements. In the embodiment of FIGS. 1 through 3 the plane defining indices of plate 2 are the line defined by J-shaped lip 7 and the parallel line defined by male coupling members 8. The matching indices of bag 1 are the outward projecting lip 5 and the female coupling members 6.

Figure 4:
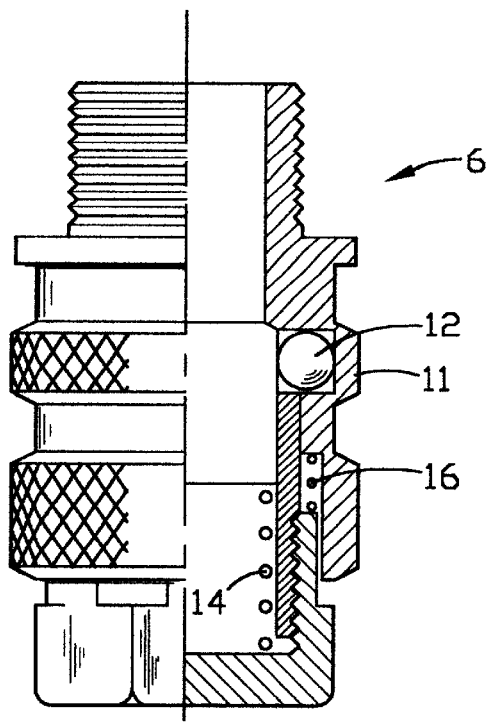
FIG. 4 is a half sectioned view of a female coupling member which is a part of this invention.
Figure 5:
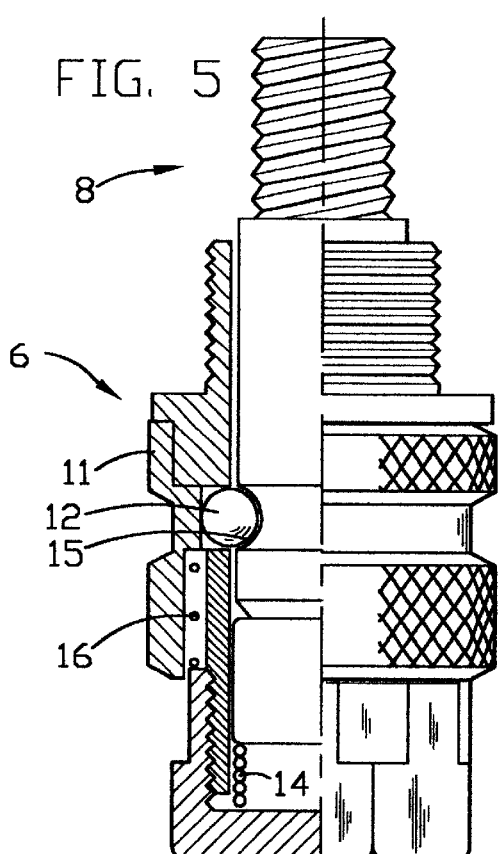
FIG. 5 is a half sectioned view of the female coupling member of FIG. 4 having a male coupling member of this invention engaged therewith.
Figure 6:
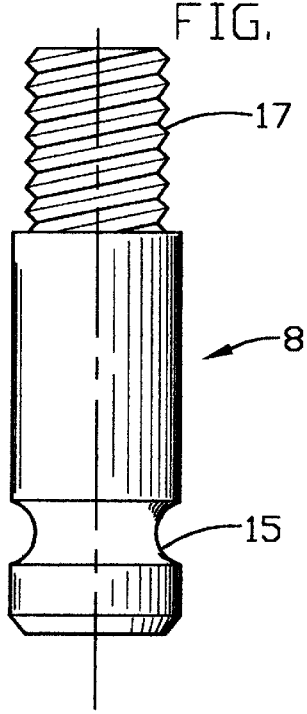
FIG. 6 is an elevational view of a male coupling member of this invention.
Figure 7:
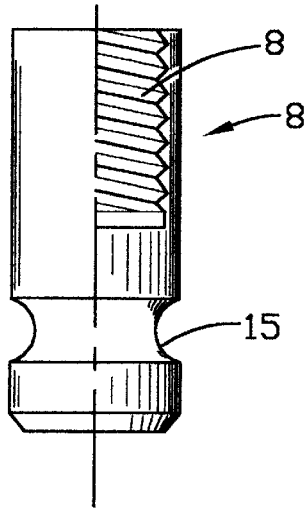
FIG. 7 is an elevational view of a second male coupling member of this invention.
Figure 8:
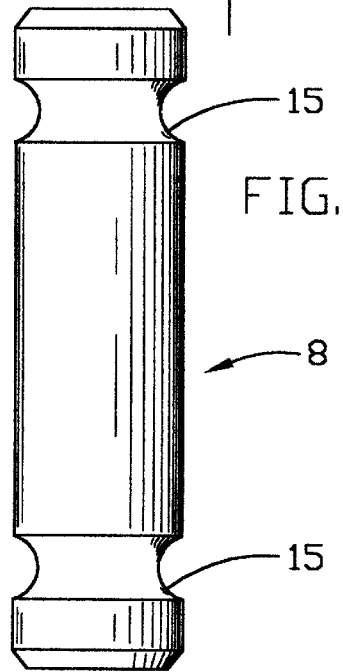
FIG. 8 is an elevational view of a double ended male coupling member of this invention.

Mounting plate 2 is provided with mounting holes 10 by means of which mounting plate 10 may be secured directly to a substantially planer surface or to which transitional links can be secured for securing plate 2 to the frame of a motorcycle or an all terrain vehicle or a snowmobile or the like Referring now to FIGS. 4–8 wherein details of female coupling member 6 and male coupling member 8 are shown. In FIG. 4 female coupling member 6 is shown in the uncoupled configuration and in FIG. 5 female coupling member 6 is shown coupled with male coupling member 8. Coupling members 6 and 8 are coupled by inserting male coupling member 8 into female coupling member 6 and pushing retaining sleeve 13 against the resistance of sleeve compression spring 14 until ball bearing 12 drops into locking groove 15 thereby permitting locking collar 11 to be urged into the position shown in FIG. 5 under the urging of locking collar spring 16 to secure male coupling member 8 in female coupling member 6. In FIG. 6 male coupling member 8 is shown to have external threads for securing member 8 to a mounting means. In FIG. 7 male coupling member 8 is shown to have internal threads 18 for securing male coupling member 8 to a mounting means. In FIG. 8 male coupling means 8 is shown to have a double end for joining two saddled bags 1 as shown in FIG. 9

While the mechanisms for the type of coupling disclosed in FIGS. 1–8 are well known in the art, it is not known in the saddlebag art to employ this mechanism as a quick release means for attaching a bag or luggage to a mounting plate. Because mounting plate 2 and male coupling members 8 are simple in construction and relatively inexpensive to make, the user can attach mounting plates to various locations on vehicles and in or on structures so that bag 1 can be readily transferred from one use point to another. Further, as shown in FIG. 8 a double ended male coupling member can be employed to join two bags together as illustrated in FIGS. 9 and 10.

Figure 9:
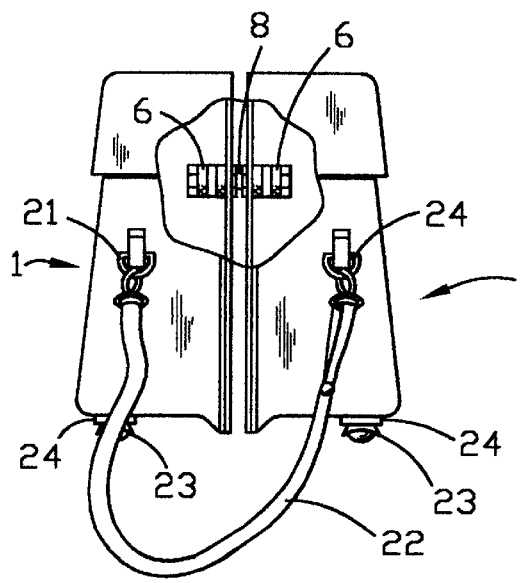
FIG. 9 is an elevational view of the saddle bags of this invention rigged for towing.
Figure 10:
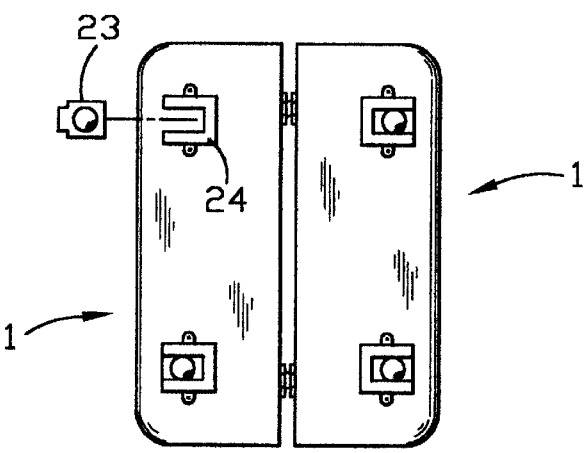
FIG. 10 is a bottom view of the saddle bag of this invention illustrating the castors and castor receiver for attaching wheeling means to the bag.

Referring now to FIG. 9 wherein two saddle bags 1 are shown as luggage joined together. When serving as luggage, saddle bags 1 can be joined together for transport by inserting double ended male coupling members 8 into female coupling members 6 of bags 1 as shown in FIG. 9. To facilitate transport away from the motorcycle, bags 1 are provided with D-rings 21 to which adjustable strap 22 is securable. Strap 22 is adjustable to permit it to serve as a shoulder strap, a carrying strap, or a towing strap as shown in FIG. 9. Removable castors 23 provide a means for rolling combined bags 1 over a surface such as a parking lot down a hallway. As shown in FIG. 10 castor receivers 24 are secured to the bottoms of bags 1 and castors 23 are secured in castor receiver 24 and engaged therewith.

Saddle bags that were used by horsemen were joined together with a leather band that passed over a horses back and the saddle bags when removed from the horse served as luggage. The instant invention improves on that concept by permitting the use of one or both saddle bags as luggage or the joining together of both saddle bags to form a single piece of luggage.

Figure 11:
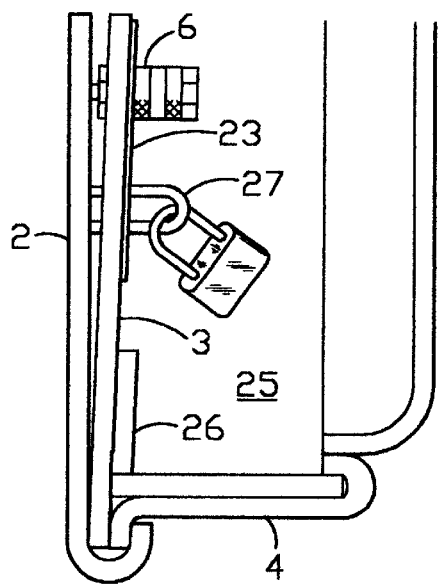
FIG. 11 is a sectioned side elevational view of the saddle bag of this invention illustrating a stiffening and strengthening means for the bag.
Figure 12:
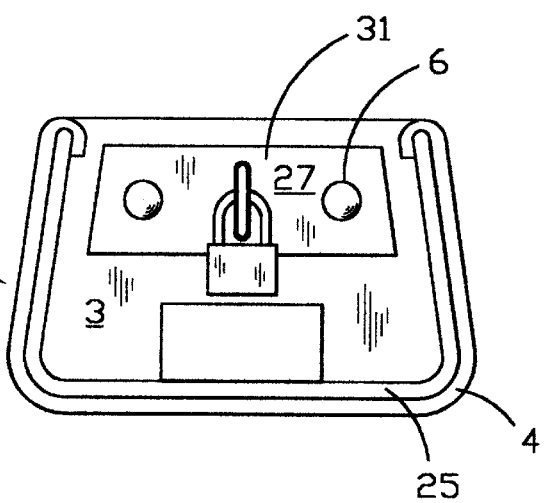
FIG. 12 is a sectioned front elevational view of the bag of FIG. 11.

Referring now to FIGS. 11 and 12 wherein strengthening and stiffening means are provided to saddle bag 1 in order to render it serviceable and durable as both a saddle bag and luggage. Gusset stiffener 25 is of flexible and durable material and is substantially coextensive with gusset 4 and serves as a stiffener and an anchoring base for castor receivers 24 and for D-rings 21 of FIGS. 9 and 10. Stiffener 25 hold down 26 serves to hold gusset stiffener 25 against gusset 4 along the bottom of bag 1 and serves to resist the upward pressure of castors 23 when bag 1 is functioning as towed luggage. Stiffener plate 27 serves as a stiffener for back panel 3 and a mounting base for female coupling members 6. Security D-ring 28 is secured to mounting plate 1 so as to pass through back panel 3 and stiffener plate 27 by way of slot 31 so as to enable the attachment of security lock 32.

Saddle bags 1 are configured in the style of motorcycle saddle bags. However, as described above saddle bags 1 are reinforced to support the add loads and pressures placed on saddle bags 1 by the added utilities provided for saddle bags 1 by this invention.

Figure 13:
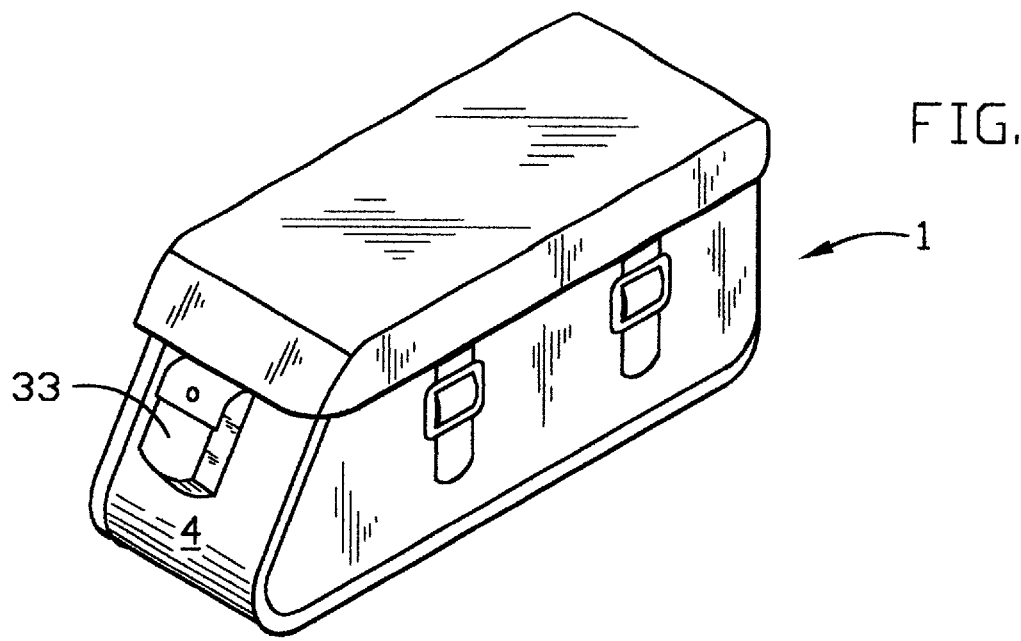
FIG. 13 is a pictorial view of the bag of this invention illustrating the provision of an external pouch which serves as readily accessible storage for accessories.

Referring now to FIG. 13 wherein an attachable pouch 33 is provided attached to gusset 4 in a "piggy back" relationship to saddle bag 1. Pouch 1 serves as an external repository for items such as double ended coupling members 8, straps 22, castors 23 and the like so as to render them accessible and storable without the need to enter bag 1.

Pouch 33 is an auxiliary function recited here to comply with the applicant's duty to disclose the best mode of practicing the invention at the time this application is filed.

Figure 14:
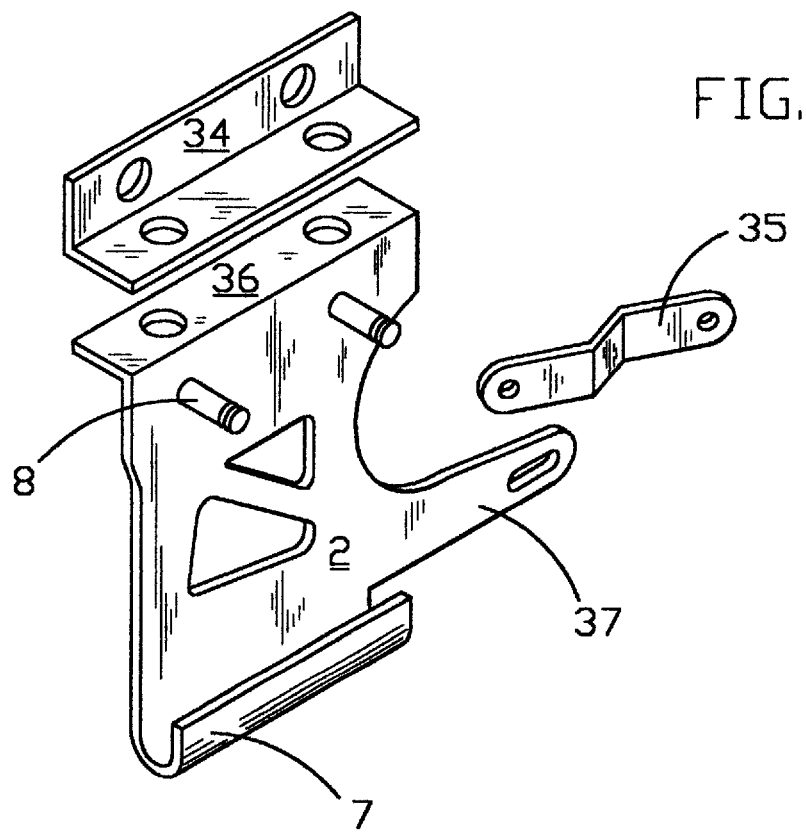
FIG. 14 is a pictorial view of the mounting plate of this invention having means for securing transition links to the mounting plate.

Referring now to FIG. 14 wherein mounting plate 2 is provided with means for attaching top transitional link 34 and for attaching bottom transitional link 35. Different manufactures of motorcycles have different configurations of frame structures to which mounting plate 2 is to be secured. Mounting plate two is provided with a J-shaped lip 7 and male coupling members 8 to receive and mount a bag 1. Mounting plate 2 is also provided with a top flange 36 to which top transition link 3 may be secured and bottom mounting pad 37 to which bottom transition link 37 may be secured. Transition links 34 and 35 are given different structures and configurations to accommodate to the different frame constructions of various manufactures of motorcycles or other vehicles and structures.

As shown in FIG. 14, mounting plate 2 is plane defining plate and is given a shape different from mounting plate 2 of FIGS. 1 through 3 without departing from the critical plane defining concept of mounting plate 2.

The above disclosures would enable one skilled in the art to make and use the saddle bag, mounting plate and coupling means of this invention without undue experimentation. However it should be understood that numerous variants of the elements of this invention are within the scope of this invention. Therefore the scope of this invention should not be limited to the scope of the disclosed embodiments, but the scope of the invention should be only limited to the scope of the appended claims and all equivalents thereto that would become apparent to one skilled in the art by these disclosures.

What is claimed is;

1. A saddle bag and mounting means therefore comprising:

a) at least one saddle bag having a substantially planer back panel and a gusset forming two sides and the bottom of the saddle bag and the gusset is joined to the back panel to form an outward projecting seam, b) at least one quick release female coupling member mounted on the back panel inside the saddle bag and near the top of the back panel, c) a mounting means having a top edge and a bottom edge and having a J-groove formed along the bottom edge and at least one male coupling member mounted near its top edge and positioned so that when the outward projecting seam of the saddlebag rests in the J-groove and said male coupling member at the top of the mounting plate is inserted into said female coupling member at the top of the back panel and latched therein the saddlebag is securely attached to the mounting means, and the mounting means is provided with a means for securing the mounting means to a structure.

2. The saddle bag and mounting means of claim 1 wherein the quick release female coupling member is provided with a ring of spherical detents and a spring biased sleeve that when retracted will permit the male coupling member having a circumferential groove for receiving the detents to enter the female member so that when the sleeve is permitted to return to its resting position under the spring bias, the detents will be held within the circumferential groove of the male member and the coupling members will be locked in engagement.

3. The saddle bag and mounting means of claim 1 wherein the mounting means is a plane defining metal plate.

4. The saddle bag and mounting means of claim 1 wherein the mounting means is provided with a means for securing transition pieces to the mounting means so as to enable the securement of the mounting means to a non-planar structure.

5. The saddle bag and mounting means of claim 1 wherein the gusset is reinforced with a gusset stiffener of flexible and durable material and said gusset stiffener is substantially coextensive with the inside surface of the gusset.

6. The saddle bag and mounting means of claim 1 wherein the back panel is reinforced with a stiffener plate at the location of attachment of the female coupling member.

7. The saddle bag and mounting means of claim 1 wherein the saddle bag is provided with a means for securing detachable wheels to the bottom of the saddle bag.

8. The saddle bag and mounting means of claim 1 wherein the bag is provided with a means for attaching a strap to the saddle bag.

9. The saddle bag and mounting means of claim 1 wherein the bag is provided with an external pouch.

10. The saddle bag and mounting means of claim 1 wherein a first saddle bag and a first mounting means are secured to a vehicle and a second saddle bag and a second mounting means are secured to the vehicle and when the first saddle bag is detached from the first mounting means and the second saddle bag is detached from the second mounting means, they are attachable to each other by means of a two ended male coupling member having a circumferential groove at a first end engaging with the female coupling member of said first saddle bag and a circumferential groove at a second end engaging with the female coupling the female coupling member of the second saddle bag to join the first saddle bag and the second saddle bag to each other.

* * * * *